United States Patent
Moenning et al.

[19]

[11] Patent Number: 6,131,214
[45] Date of Patent: *Oct. 17, 2000

[54] MEDICAL TABLE HAVING A NUMBER OF ROLLERS WHICH COLLECTIVELY DEFINE A BED SURFACE AND AN ASSOCIATED METHOD FOR MOVING A PATIENT FROM A FIRST POSITION TO A SECOND POSITION

[76] Inventors: Stephen P. Moenning, 124 Hibiscus, Punta Gorda, Fla. 33950; Donald M. Judy, 2396 Seagull La., North Fort, Fla. 34287; Douglas B. Thatcher, 365 Altoona St., Fort Charlotte, Fla. 33948

[*] Notice: This patent is subject to a terminal disclaimer.

[21] Appl. No.: 09/036,251

[22] Filed: Mar. 6, 1998

Related U.S. Application Data

[63] Continuation of application No. 08/815,622, Mar. 13, 1997, Pat. No. 5,781,943.

[51] Int. Cl.[7] .............................. A61G 7/08; A61G 7/16; B65G 13/02
[52] U.S. Cl. ............................ 5/81.1 C; 5/81.1 R; 5/689; 5/702; 5/715; 5/912; 5/913; 193/37; 193/35 F; 198/782
[58] Field of Search .............................. 5/81.1 C, 81.1 R, 5/689, 702, 715, 912, 913, 88.1, 709, 710, 660, 911; 193/37, 35 F; 198/782

[56] References Cited

U.S. PATENT DOCUMENTS

| | | |
|---|---|---|
| 378,220 | 2/1888 | Staples et al. . |
| 716,886 | 12/1902 | Goode . |
| 2,918,681 | 12/1959 | Davis . |
| 3,493,979 | 2/1970 | Koll et al. .............................. 5/81.1 C |
| 3,593,351 | 7/1971 | Dove . |
| 3,622,073 | 11/1971 | Cayre ..................................... 238/10 R |
| 3,765,037 | 10/1973 | Dunkin . |
| 3,810,263 | 5/1974 | Taylor et al. ........................... 5/81.1 C |
| 3,854,152 | 12/1974 | Chez . |
| 3,967,328 | 7/1976 | Cox . |
| 4,688,556 | 8/1987 | Keller, Jr. ............................... 601/122 |
| 4,761,000 | 8/1988 | Fisher et al. . |
| 4,914,682 | 4/1990 | Blumenthal . |
| 4,941,220 | 7/1990 | DiMatteo et al. .................. 5/81.1 C X |
| 5,054,140 | 10/1991 | Bingham et al. . |
| 5,742,958 | 4/1998 | Solazzo .................................. 5/81.1 R |
| 5,781,943 | 7/1998 | Moenning et al. ................. 5/81.1 R X |
| 5,855,207 | 1/1999 | Moenning et al. ................. 5/81.1 C X |

*Primary Examiner*—Michael F. Trettel
*Assistant Examiner*—Robert G. Santos
*Attorney, Agent, or Firm*—Maginot, Addison & Moore

[57] ABSTRACT

A medical table includes a base. The medical table also includes a number of rollers, supported by the base, which collectively define a bed surface for supporting a patient, wherein each roller of the number of rollers (1) defines a fluid impervious bag having a void therein, and (2) contains a plurality of beads within the void of the fluid impervious bag, and further wherein the number of rollers includes a prime roller having a shaft extending therefrom. The medical table further includes a motor mechanically coupled to the shaft of the prime roller. The medical table also includes a vacuum source in fluid communication with each void of the number of rollers. A method of moving a patient from a first position to a second position is also disclosed.

4 Claims, 14 Drawing Sheets

MEDICAL TABLE HAVING A NUMBER OF ROLLERS WHICH COLLECTIVELY DEFINE A BED SURFACE AND AN ASSOCIATED METHOD FOR MOVING A PATIENT FROM A FIRST POSITION TO A SECOND POSITION

This application is a continuation of U.S. application Ser. No. 08/815,622, filed Mar. 13, 1997, now U.S. Pat. No. 5,781,943.

BACKGROUND OF THE INVENTION

The present invention generally relates to a medical table, and more particularly relates to a medical table and a method for moving a patient from a first position to a second position.

Many medical procedures are performed with a patient lying on a medical table. Typically, the medical table on which the patient is lying is made from a very hard and uncomfortable material. Moreover, many medical procedures require the patient to be minimally clothed and may take a significant amount of time to complete. Therefore, the patient lying on the table can become very uncomfortable (e.g. cold, or hot if the patient is suffering from a fever), which increases the stress he or she experiences during the medical procedure.

Additionally, it often becomes necessary to adjust the patient's position on the medical table from a first position to a second position in order to successfully complete the medical procedure. For example, patients undergoing a colonoscopic medical procedure are frequently moved from a supine position (i.e. denoting a body when lying face upward) to a lateral position (i.e. denoting a body when lying on its side) to facilitate the advancement of an endoscope to a patient's colon. Furthermore, other medical procedures, such as radiographic imaging studies, may require a patient to be moved from a supine position to a prone position (i.e. denoting a body when lying face downward).

The movement of a patient lying on a medical table from a first position to a second position has heretofore largely depended upon a great deal of physical effort being exerted by attending medical personnel. For example, to move a patient positioned in a supine position to a prone position typically requires attending medical personnel to pull or tug a bed sheet on which the patient is lying so as to gradually move the patient toward an edge of the medical table. As the patient is moved toward the edge of the medical table, other medical personnel lift and push the patient's shoulder which is closest to the edge, in a direction opposite to the direction the bed sheet is being pulled. The simultaneous pulling of the bed sheet in one direction, while the patient's shoulder is lifted and pushed in the opposite direction, rolls the patient over from a supine position to a prone position.

One disadvantage of repositioning the patient in the above described manner is that the involved medical personnel are prone to injuries resulting from the pulling or tugging of the bed sheet. For example, they sometimes suffer from sprained wrists or backs that occasionally result in incurring some degree of disability. This is especially true when the patient is a large adult. Another disadvantage is that the pulling or tugging of the bed sheet causes the patient to be moved in a "jerking motion." This jerking motion can be extremely uncomfortable, or even dangerous to the patient depending upon the type of illness of the patient (e.g. osteoporosis or arthritis).

Patients are also moved from a first position to a second position utilizing a "tilt table." Tilt tables are constructed such that the patient positioned thereon can be tilted or angled relative to the ground. Once the patient is angled, medical personnel utilize the force of gravity to move the patient from a first position to a second position. For example, a tilt table can be used to roll the patient over from a supine position to a prone position. However, one disadvantage of the aforementioned procedure is that the use of gravity can result in the patient being moved in a relatively uncontrollable fashion. Moving the patient in a relatively uncontrollable fashion increases the danger to the patient.

It would therefore be desirable to provide a medical table that reduces injuries to medical personnel when moving a patient from a first position to a second position during a medical procedure. It would also be desirable to provide a medical table that reduces the physical effort required by medical personnel when moving a patient from a first position to a second position during a medical procedure. It would further be desirable to provide a medical table that safely moves a patient from a first position to a second position during a medical procedure. It would still further be desirable to provide a medical table that is comfortable for a patient.

SUMMARY OF THE INVENTION

In accordance with one embodiment of the present invention, there is provided a support apparatus. The support apparatus includes a base. The support apparatus also includes a number of rollers supported by the base, wherein each roller of the number of rollers (1) defines a fluid impervious bag having a void therein, and (2) contains a plurality of beads within the void of the fluid impervious bag.

In accordance with another embodiment of the present invention, there is provided a medical table. The medical table includes a base. The medical table also includes a number of rollers, supported by the base, which collectively define a bed surface for supporting a patient, wherein each roller of the number of rollers (1) defines a fluid impervious bag having a void therein, and (2) contains a plurality of beads within the void of the fluid impervious bag, and further wherein the number of rollers includes a prime roller having a shaft extending therefrom. The medical table further includes a motor mechanically coupled to the shaft of the prime roller. The medical table also includes a vacuum source in fluid communication with each void of the number of rollers.

According to another embodiment of the present invention, there is provided a method of moving a patient from a first position to a second position. The method includes the steps of (1) providing a number of rollers which collectively define a bed surface, wherein each roller of the number of rollers defines a fluid impervious bag having a void therein, and contains a plurality of beads within the void of the fluid impervious bag, (2) providing a vacuum source in fluid communication with each void of the number of rollers, (3) decoupling each void of the number of rollers from the vacuum source so that the plurality of beads are not inhibited from moving relative to each other, (4) locating a patient in a first position on the bed surface during the decoupling step, (5) coupling the vacuum source to each void of the number of rollers so that the plurality of beads are inhibited from moving relative to each other, and (6) rotating the number of rollers during the vacuum coupling step so as to move the patient from a first position to a second position.

It is therefore an object of the present invention to provide a new and useful medical table.

It is another object of the present invention to provide an improved medical table.

It is yet another object of the present invention to provide a new and useful support apparatus.

It is still another object of the present invention to provide an improved support apparatus.

It is another object of the present invention to provide a new and useful method of moving a patient from a first position to a second position.

It is still another object of the present invention to provide an improved method of moving a patient from a first position to a second position.

It is yet another object of the present invention to provide a medical table that reduces the risk of injuries to medical personnel when moving a patient from a first position to a second position during a medical procedure.

It is yet another object of the present invention to provide a medical table that reduces the amount of physical effort required by medical personal when moving a patient from a first position to a second position during a medical procedure.

It is still another object of the present invention to provide a medical table that safely moves a patient from a first position to a second position during a medical procedure, such as during a radiographic imaging study.

It is yet another object of the present invention to provide a medical table that is comfortable for a patient.

The above and other objects, features, and advantages of the present invention will become apparent from the following description and attached drawings.

DETAILED DESCRIPTION OF THE PREFERRED EMBODIMENT

Figure 1:
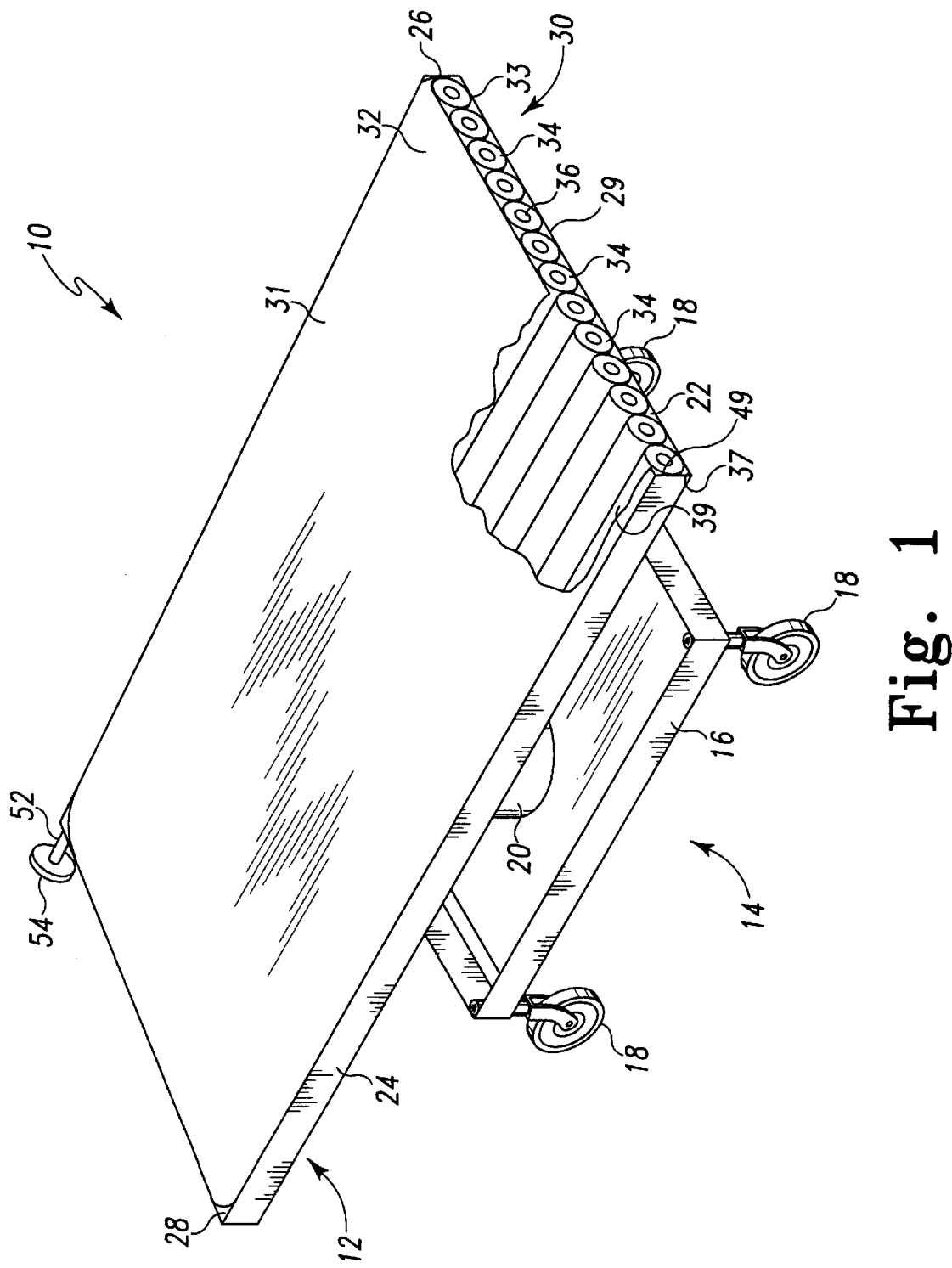
FIG. 1 is a perspective view of a medical table that incorporates the features of the present invention therein, with an end wall and a portion of the belt of the medical table removed for clarity of description.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
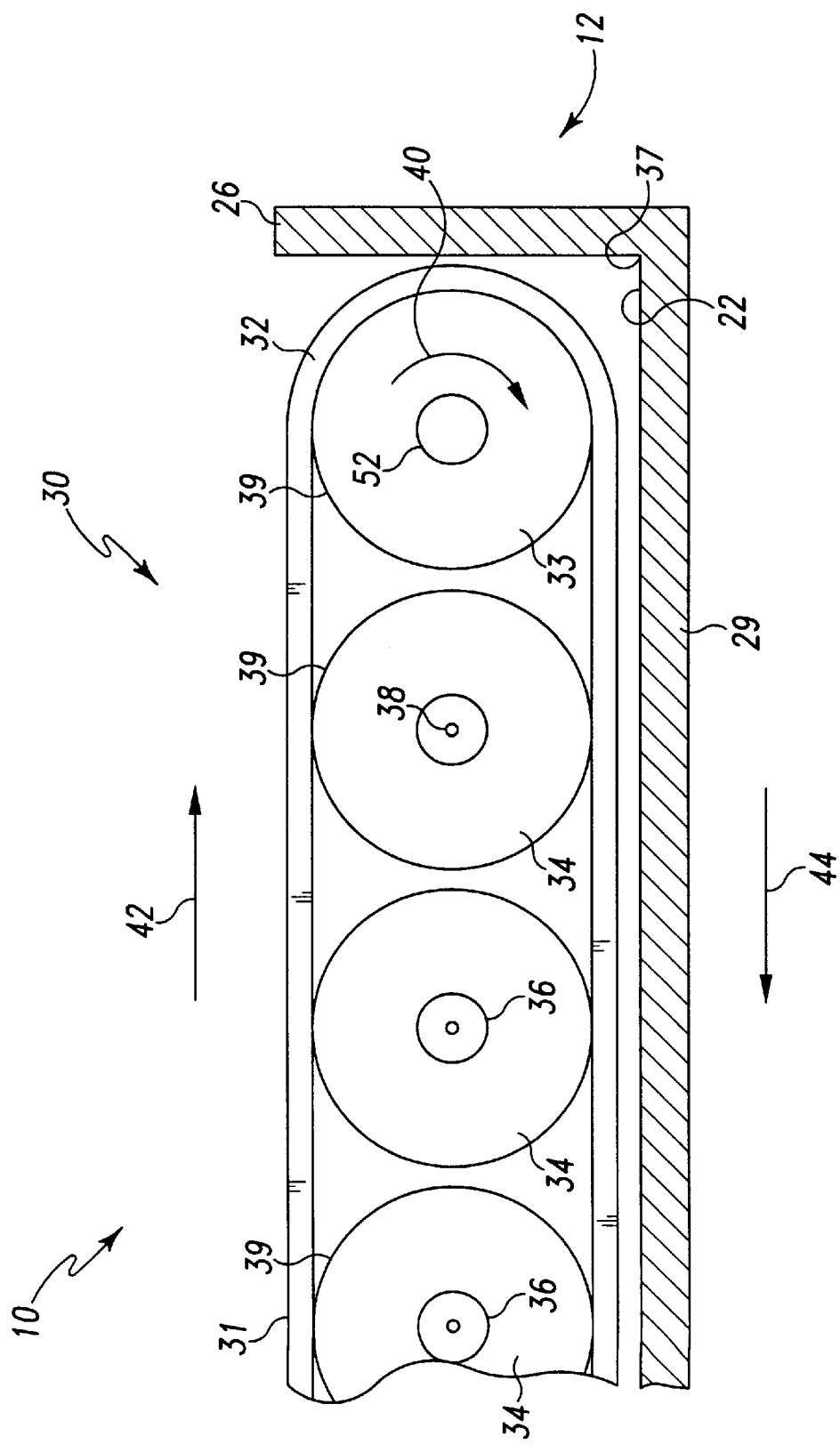
FIG. 2 is an enlarged fragmentary elevational view of an end of the medical table of FIG. 1, with the one-way valves of the secondary rollers removed for clarity of description.
Figure 3:
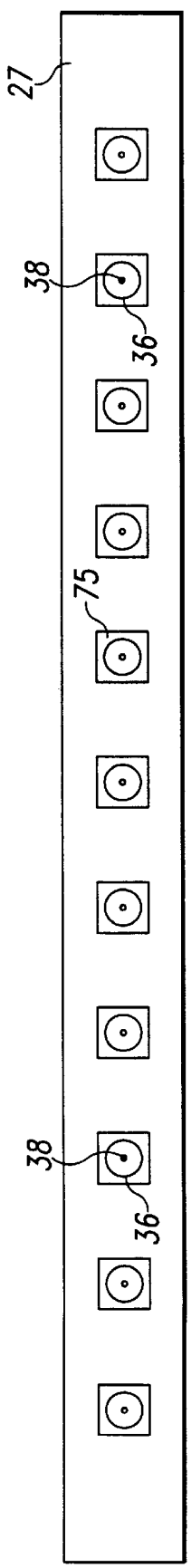
FIG. 3 is an elevational view of the end wall of the medical table of FIG. 1, showing a number of ball-bearing brackets mounted therein.

Referring to FIGS. 1, 2 and 3, there is shown a medical table 10 which safely and comfortably moves or facilitates moving a patient lying thereon from a first position to a second position. For example, operation of medical table 10 moves a patient from a supine position (i.e. denoting a body when lying face upward) to a prone position (i.e. denoting a body when lying face downward) as will be discussed below.

Medical table 10 includes a bed shell 12 having a roller-belt complex 30 mounted in bed shell 12. Medical table 10 also includes a support member 20 attached to and supporting bed shell 12. Support member 20 is attached to a cart 14 having a frame 16 and four wheels 18 (note that only three of the wheels are shown in FIG. 1). It should be appreciated that wheels 18 allow medical table 10 to be easily rolled and moved from one location to another. It should also be understood that support member 20 can include a vertical lifting mechanism (not shown). Such a lifting mechanism allows height adjustments of medical table 10 to be made to match the height of an adjoining surface to which, or from which, a patient is to be transferred.

Bed shell 12 includes a rectangular shaped, substantially planar base 22. Base 22 has the appropriate dimensions to fully support a patient positioned on medical table 10. Bed shell 12 also includes a side wall 24 and a side wall 26, each upwardly extending from a longitudinal edge of base 22. Bed shell 12 further includes an end wall 27 upwardly extending from an end edge 29 of base 22. (Note that in FIGS. 1 and 2, end wall 27 has been removed from medical table 10 for clarity of description.) End wall 27 is connected to side wall 24 and side wall 26. Note that end wall 27 is only shown connected to medical table 10 in FIG. 3. Bed shell 12 also includes an end wall 28 upwardly extending from an end edge of base 22 located opposite to end edge 29. End wall 28 is connected to side wall 24 and side wall 26 as shown in FIG. 1. Having bed shell 12 constructed in the above described manner results in base 22, side wall 24, side wall 26, end wall 27 and end wall 28 defining a substantially rectangular receptacle 37.

As shown in FIGS. 1 and 2, roller-belt complex 30 is contained within receptacle 37. Roller-belt complex 30 includes one cylindrically shaped prime roller 33 located adjacent to side wall 26 and one cylindrically shaped end roller 49 located adjacent to side wall 24 (see FIG. 1). Roller-belt complex 30 also includes a plurality of cylindrically shaped secondary rollers 34 contained within receptacle 37 and interposed between prime roller 33 and end roller 49. Prime roller 33, end roller 49 and each secondary roller 34 has a cylindrically shaped outer portion 39. Hereinafter prime roller 33, end roller 49 and secondary rollers 34 will be collectively referred to as "the rollers".

The rollers are arranged relative to base 22 such that their longitudinal axes are in a substantially parallel relationship. Moreover, the rollers have a lengthwise dimension such that they extend along the entire length of base 22. Also, the rollers are arranged on base 22 such that their exterior portions 39 (see FIG. 2) collectively define a bed surface for supporting a patient thereon.

Roller-belt complex 30 also includes a belt 32 disposed around the rollers. A portion of belt 32 has been removed in FIG. 1 to illustrate the cylindrical nature of the rollers. It should be understood that the width of belt 32 is substantially equal to the length of the rollers. Thus, belt 32 defines a platform surface 31 for receiving a patient thereon.

As more clearly shown in FIG. 2, belt 32 is disposed around the rollers in such a way that it frictionally engages outer portion 39 of prime roller 33. Belt 32 is also disposed around the rollers in such a way that it frictionally engages outer portion 39 of end roller 49. Therefore, as prime roller 33 is rotated around its longitudinal axis by a motor M (see FIG. 4) in a clockwise direction as indicated by arrow 40, belt 32 is forced to rotate around a path defined by the rollers in the directions indicated by arrows 42 and 44. As a result of the above described rotation of belt 32, platform surface 31 moves in the direction indicated by arrow 42 (i.e. toward side wall 26). Thus, any object, such as a patient, placed on platform surface 31 will also move in the direction indicated by arrow 42. It should be understood that motor M (see FIG. 4) is capable of switching between rotating prime roller 33 in a clockwise direction and a counter-clockwise direction.

Figure 4:
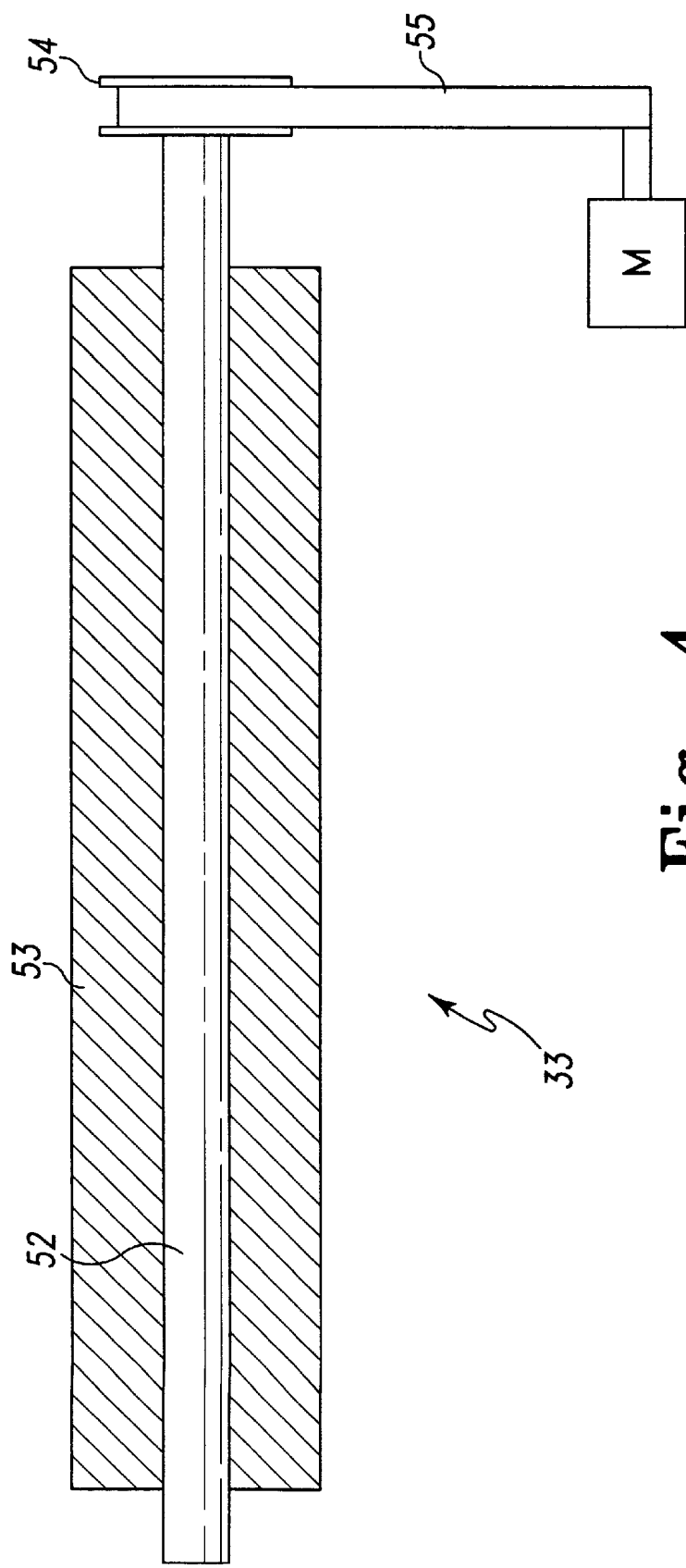
FIG. 4 is a cross sectional view of a prime roller of the medical table of FIG. 1, having a shaft disposed therein and a pulley attached to one end of the shaft (note: the pulley and portions of the shaft are not shown in cross section for clarity of description and the prime roller is schematically shown coupled to a motor)

Now referring to FIG. 4, prime roller 33 includes a substantially cylindrical member 53 made out of an elastomeric material such as rubber. Prime roller 33 also contains a shaft 52 positioned in coaxial relationship with cylindrical member 53. Shaft 52 is secured to cylindrical member 53 such that no relative rotational movement occurs between these two elements. An end of shaft 52 is attached to a pulley 54. Pulley 54 is attached to shaft 52 such that no relative rotational movement occurs between these two elements.

Figure 13:
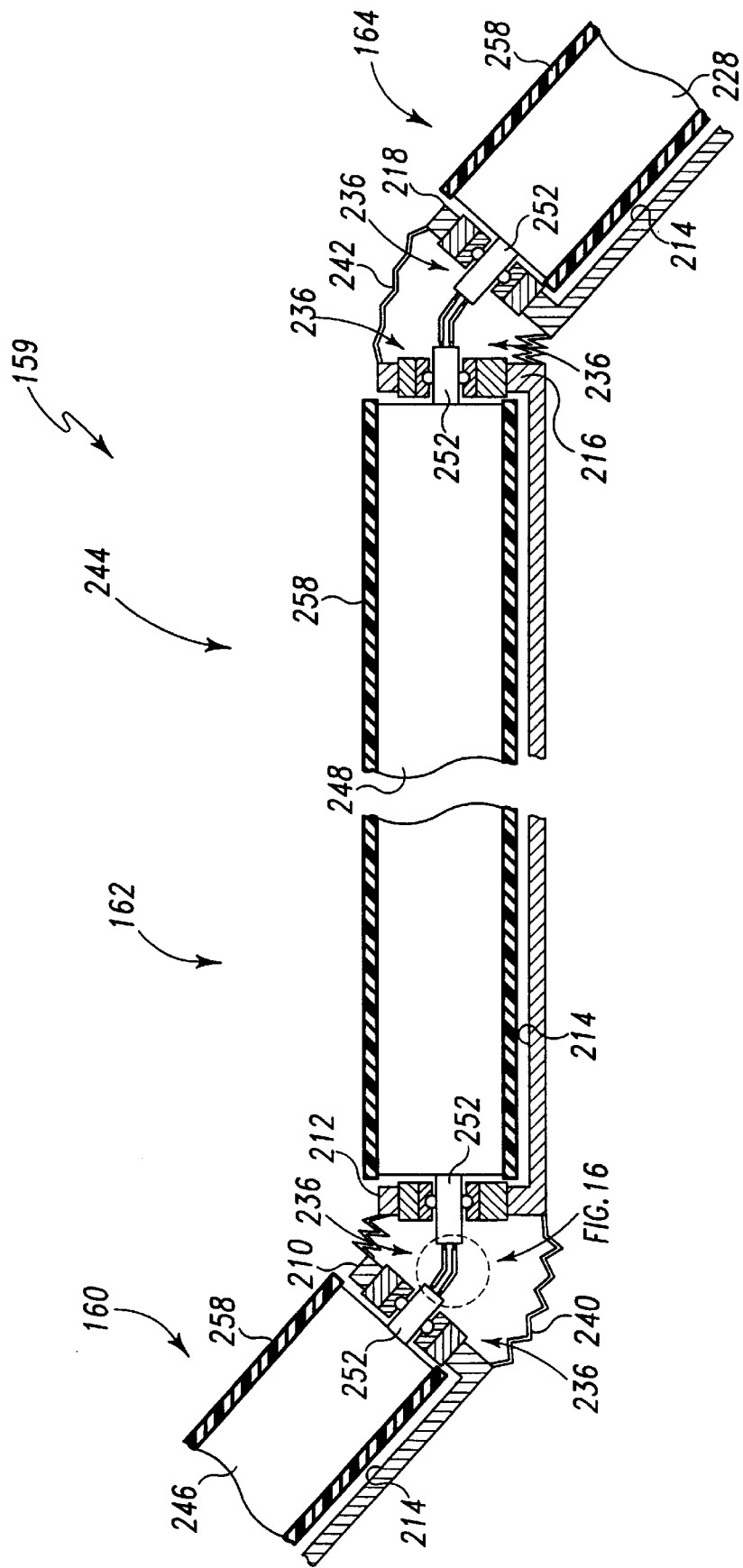
FIG. 13 is an enlarged cross sectional view similar to that shown in FIG. 12, with the prime roller removed to show a secondary roller.

A ball-bearing bracket (not shown) identical to a ball-bearing bracket 236 shown in FIG. 13 is mounted in end wall 28 (see FIG. 1) such that a passageway (not shown) is formed through end wall 28. The portion of shaft 52 interposed between pulley 54 and cylindrical member 53 is positioned in the passageway so that shaft 52 contacts an inner race of the ball-bearing bracket and extends through the passageway. Positioning the shaft 52 in the above described manner locates pulley 54 outside of receptacle 37 as shown in FIG. 1. It should be understood that having pulley 54 located in the above described location allows a portion of a drive band 55 to be entrained around pulley 54, while having another portion of drive band 55 operatively coupled to motor M (see FIG. 4). Having drive band 55 entrained around pulley 54 and operatively coupled to motor M, couples shaft 52 of prime roller 33 to motor M. As a result, motor M is able to rotate prime roller 33 around its longitudinal axis.

The end of shaft 52, opposite to the end attached to pulley 54, is secured to end wall 27 (see FIG. 3) by any well known mechanism that allows shaft 52 to rotate about its longitudinal axis. For example, a bracket (not shown) having a bearing surface for rotatably mounting shaft 52 can be fixed to end wall 27. Shaft 52 is mounted in the bracket such that prime roller 33 is able to rotate about its longitudinal axis.

End roller 49 is identical to prime roller 33 (see FIG. 4) with the exception that the shaft contained within end roller 49 is not attached to a pulley. One end of the shaft contained in end roller 49 is secured to end wall 27, while the other end of the shaft is secured to end wall 28. The ends of this shaft are secured to end walls 27 and 28 utilizing the same method as described above for securing an end of shaft 52 to end wall 27.

Figure 5:
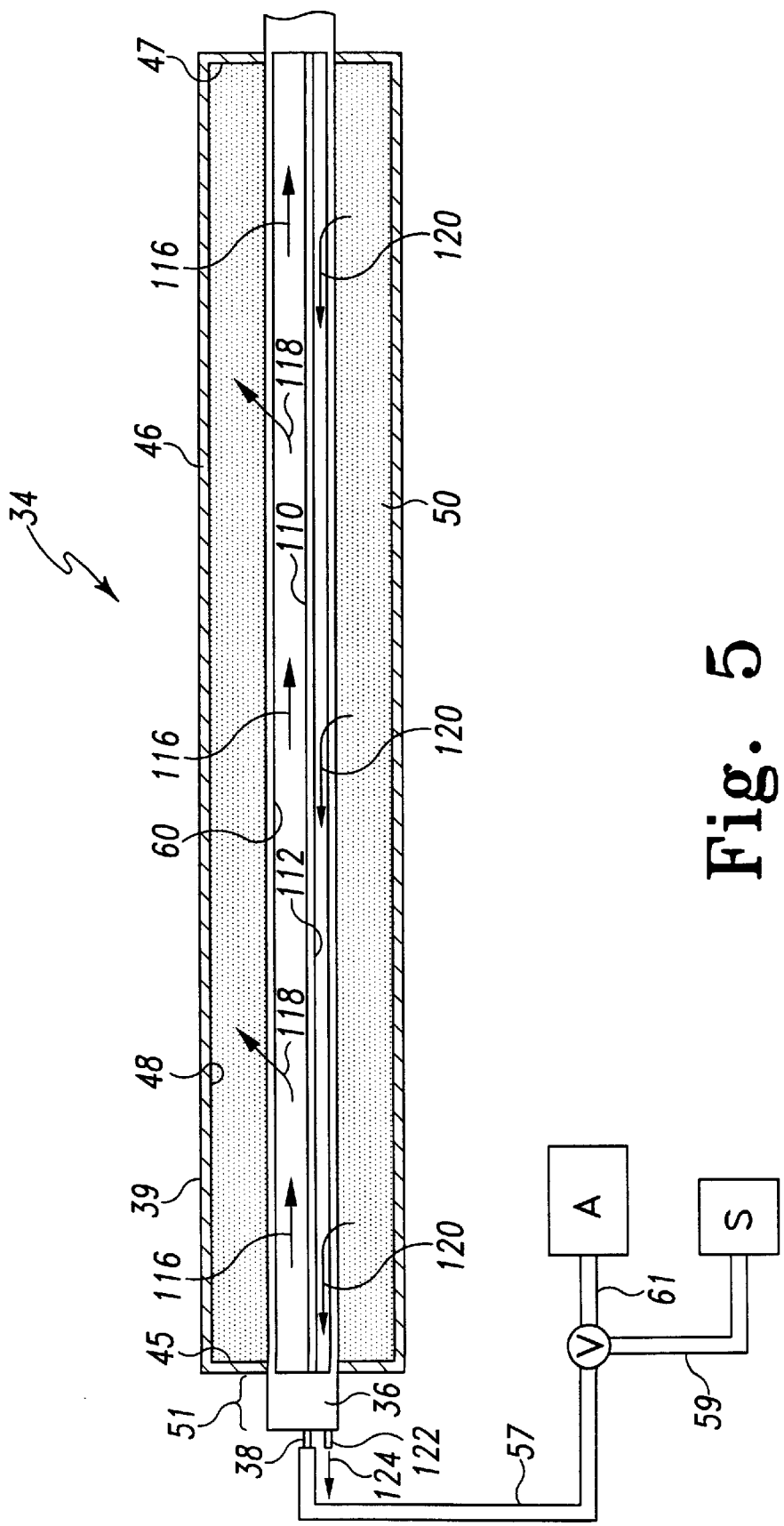
FIG. 5. is a fragmentary cross sectional view of a secondary roller of the medical table of FIG. 1, having a suction tube disposed therein (note: portions of the suction tube are not shown in cross section for clarity of description and the secondary roller is schematically shown coupled to a vacuum source and an air flow generating mechanism)
Figure 6:
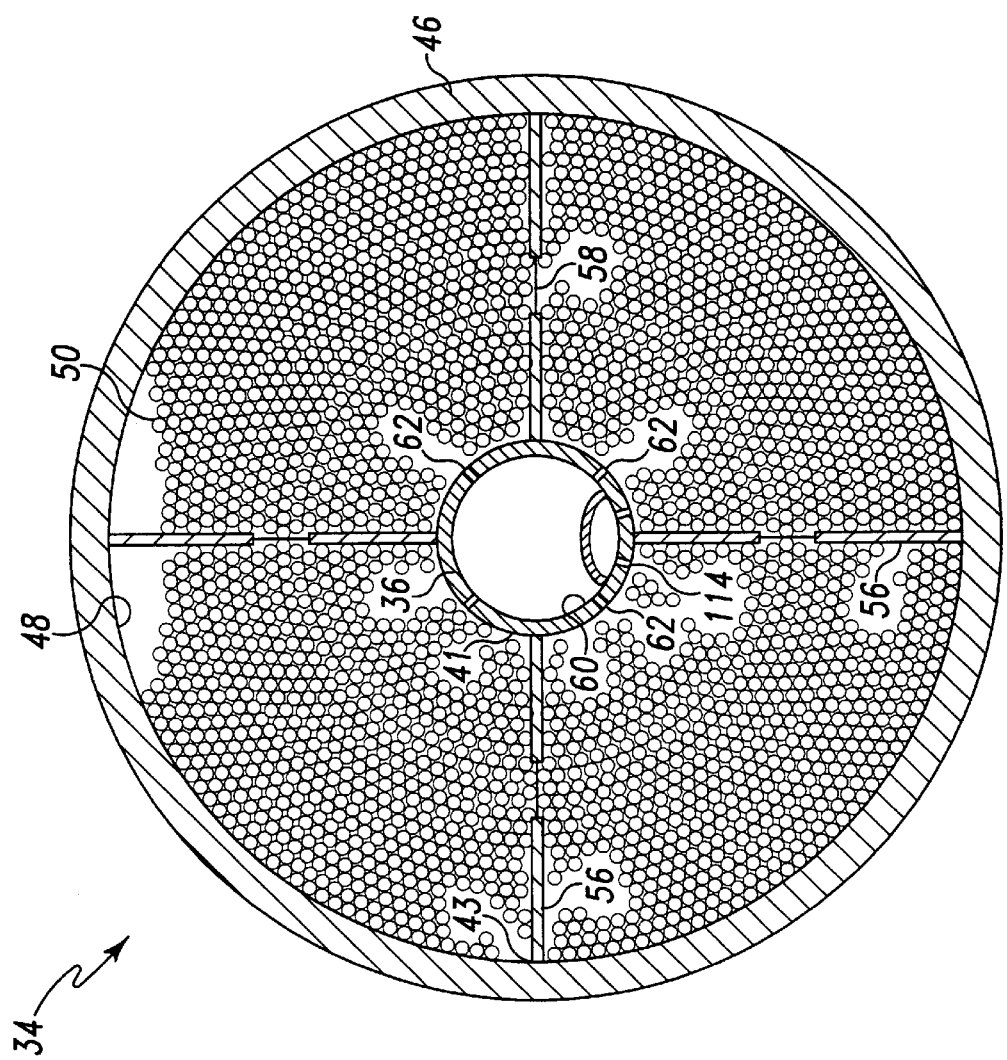
FIG. 6. is an enlarged cross sectional view of the secondary roller shown in FIG. 5.
Figure 7:
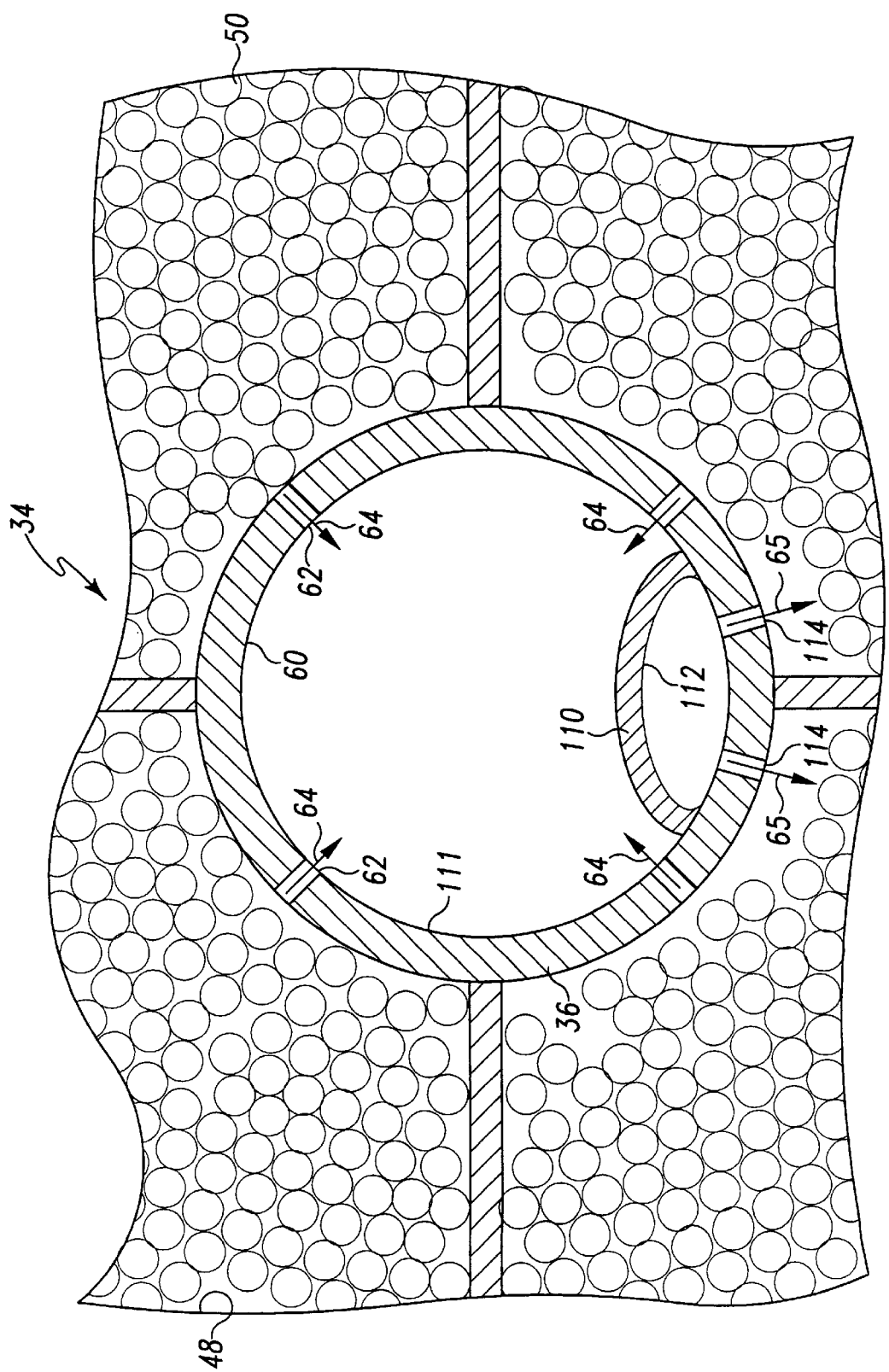
FIG. 7 is an enlarged cross sectional view of the suction tube shown in FIG. 6, with the arrows indicating the air flow going into the vacuum chamber of the suction tube.

Referring now to FIGS. 5, 6 and 7, each secondary roller 34 includes a flexible fluid impervious cylindrically shaped bag 46 having a cylindrically shaped void 48 therein. One flexible fluid impervious bag which may be used in the present invention with some modifications is described in U.S. Pat. No. 3,762,404 issued to Sakita which is herein incorporated by reference.

Each secondary roller 34 also includes a suction tube 36 contained in void 48. Suction tube 36 is located in void 48 such that suction tube 36 is in a coaxial relationship with cylindrically shaped bag 46 and is surrounded by void 48. Void 48 contains a plurality of beads 50 interposed between suction tube 36 and cylindrically shaped bag 46. Each suction tube 36 is slightly longer than the length of the cylindrically shaped bag 46 in which it is positioned. Therefore, a portion 51 (see FIG. 5) of each suction tube 36 extends out from an end of cylindrically shaped bag 46. Another portion of suction tube 36 extends out from the opposite end of cylindrically shaped bag 46.

Suction tube 36 includes a vacuum chamber 60. Vacuum chamber 60 contains a shaft cover 110 (see FIG. 7) which is attached to an interior surface 111 of suction tube 36. Shaft cover 110 and interior surface 111 define an exhaust channel 112. Shaft cover 110 and exhaust channel 112 extend the entire length of suction tube 36 and vacuum chamber 60.

As shown in FIGS. 6 and 7, suction tube 36 includes a number of ports 62 in direct fluid communication with void 48 and vacuum chamber 60. Suction tube 36 also includes a number of ports 114 in direct fluid communication with void 48 and exhaust channel 112. It should be understood that vacuum chamber 60 and exhaust channel 112 are in fluid communication only through ports 114 and 62.

Ports 62 and 114 are adapted to allow the passage of air therethrough, while preventing the passage of beads 50 into vacuum chamber 60 or exhaust channel 112, respectively. Specifically, the diameter of ports 62 and 114 can be appropriately sized to prevent the passage of beads 50 therethrough. In the alternative, a screen (not shown) having an appropriate mesh size can be placed over ports 62 and 114 and secured to suction tube 36 to prevent the entrance of beads 50 into vacuum chamber 60 and exhaust channel 112.

Each suction tube 36 is equipped with a valve 38 (see FIG. 5) which is in fluid communication with vacuum chamber 60 and therefore void 48. Valve 38 can have a well known female Luer-lock connection for attaching a hose 57 (see FIG. 5) thereto. Moreover, valve 38 may be any one of a number of valves capable of allowing the passage of air therethrough. Valve 38 must also be capable of maintaining and then releasing a vacuum. For example, valve 38 can be a conventional two way stopcock valve (not shown).

Each suction tube 36 is also equipped with a one-way valve 122 (see FIG. 5) in fluid communication with exhaust channel 112. One-way valve 122 can be any one of a number of well known check valves which only allows the flow of air therethrough in a single direction. One-way valve 122 is oriented relative to exhaust channel 112 such that it only allows air to flow out of exhaust channel 112.

Valve 38 is in fluid communication with a valve V (see FIG. 5) by way of hose 57. Valve V is in fluid communication with a vacuum source S via hose 59. Valve V is also in fluid communication with an air flow generating mechanism A via hose 61. It should be understood that valve V functions such that valve 38 is in fluid communication with either vacuum source S or air flow generating mechanism A. It should also be understood that secondary rollers 34 can be equipped with a manifold (not shown) adapted to be in fluid communication with valve 38 of each secondary roller 34. Therefore, a single hose (i.e. hose 57) can serve to place each secondary roller 34 in fluid communication with either air flow generating mechanism A or vacuum source S.

When valve V is positioned so that valve 38 of each secondary roller 34 is in fluid communication with vacuum source S, ports 62 allow the passage of air from void 48, as indicated by arrows 64 in FIG. 7, into vacuum chamber 60 while excluding beads 50. In addition, it should be understood that ports 114 allow the passage of air from exhaust chamber 112 into void 48, as indicated by arrows 65 in FIG. 7, where the air can then pass through ports 62 into vacuum chamber 60. Once in vacuum chamber 60 the air exits secondary roller 34 via valve 38. Therefore, it should be appreciated that placing valve 38 in fluid communication with vacuum source S creates a vacuum within void 48.

Any appropriate vacuum source S can be used to evacuate void 48 of secondary rollers 34. Such a vacuum source S can be manually operated or power driven. Examples of vacuum sources S which can be used in the present invention include a wall suction apparatus, aspirator pumps, or any other conveniently operating vacuum source S.

It should be understood that in a pre-evacuation state, beads 50 are substantially free to move relative to each other. As a result of the bead's ability to move relative to each other, secondary rollers 34 have a soft, pliable, bean bag like nature.

As a vacuum is created inside each void 48, the atmospheric pressure outside of secondary rollers 34 forces beads 50 together into close interengagement. The aforementioned interengagement inhibits beads 50 from moving relative to each other. The inability of beads 50 to move relative to each other upon evacuation of void 48 causes beads 50 to form a stable rigid structure. This stable rigid structure converts secondary rollers 34 from their pre-evacuation state of being soft, pliable, bean bag like structures, to their post-evacuation state of being stable rigid structures.

Beads 50 occupying void 48 must be sufficiently rigid to withstand the stresses that result when they interengage upon evacuation of void 48. Beads 50 must also have a high mechanical strength so that void 48 can be repeatedly evacuated without the accompanying attrition or fracture of the beads 50. Beads 50 should also be elastically deformable such that when void 48 is evacuated they can freely move into close interengagement to form a stable, rigid structure.

Beads of expanded plastic material, such as polystyrene and polyvinyl chloride are preferred because of their high mechanical strength, elastic deformability and low specific gravity. The expression "specific gravity" is intended to mean a true specific gravity. Thus, when such beads are made hollow the specific gravity of the beads is represented by its weight divided by its total volume including the hollow space therein. The specific gravity of the beads used in the present invention are preferably in the range of from about 0.1 to about 0.6. Such values are readily attainable with foamed synthetic resins, although other material can be used for beads 50 when they have a low specific gravity in the range specified above and satisfy the mechanical strength and elastic deformability requirements.

Beads 50 used in the present invention have a diameter ranging from about 1 to about 5 millimeters. Moreover, beads which are uniform in size and shape can be used, but a mixture of substantial portions of beads of at least two materially different sizes within the indicated range can also be used.

It should be understood that the rigidity or softness of secondary rollers 34 is dependent upon the amount of air removed from void 48. For example, if only a relatively small amount of air is removed from void 48, i.e. a "partial vacuum" is formed in void 48, the secondary roller 34 will be more rigid as compared to its pre-evacuation state, but will not be as rigid as compared to when substantially all of the air is removed from void 48. Therefore, the degree of rigidity or hardness of secondary rollers 34 (and therefore the hardness of platform surface 31) can be adjusted based upon the amount of air removed from void 48. Therefore, the degree of rigidity or hardness of secondary rollers 34 (and therefore the hardness of platform surface 31) can be adjusted based upon a patient's 66 (see FIG. 10) preference. This is an important aspect of the present invention since adjusting the rigidity or hardness of secondary rollers 34 to a patient's preference will enhance that patient's comfort during a medical procedure taking place on medical table 10.

Figure 8:
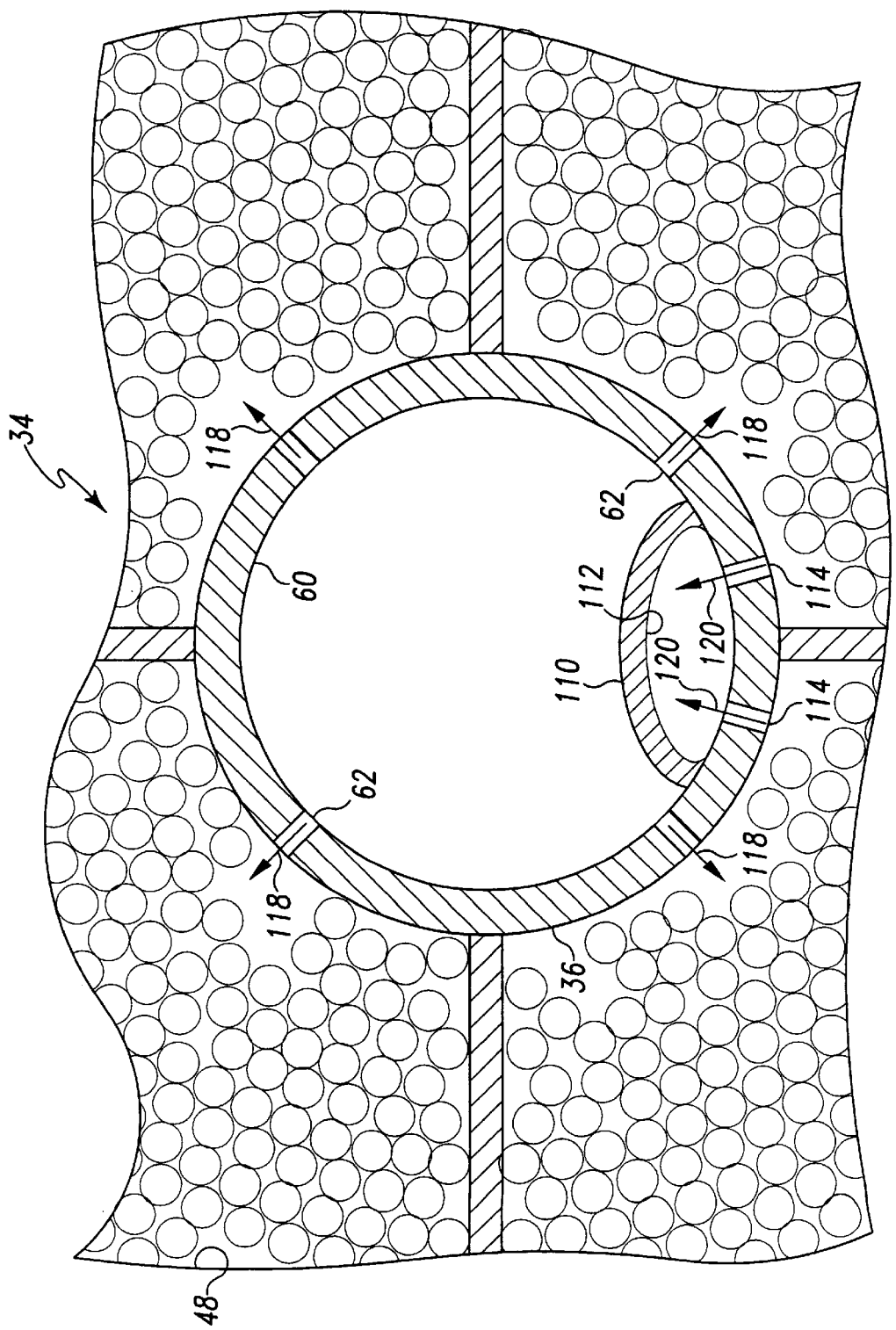
FIG. 8 is an enlarged cross sectional view of the suction tube shown in FIG. 6, with the arrows indicating the air flow going out of the vacuum chamber of the suction tube.

When valve V is positioned so that valve 38 is in fluid communication with air flow generating mechanism A, air flows through valve 38 into vacuum chamber 60 as indicated by arrows 116 (see FIG. 5). Once in vacuum chamber 60 the air passes through ports 62 into void 48 as indicated by arrows 118 in FIGS. 5 and 8. After exiting vacuum chamber 60 the air circulates throughout void 48 and then enters exhaust chamber 112 via ports 114 as indicated by arrows 120 in FIGS. 5 and 8. Once in exhaust chamber 112 the air exits secondary roller 34 via one-way valve 122 as indicated by arrow 124 in FIG. 5.

It should be understood that air flow generating mechanism A is equipped with any well known temperature control mechanism such that the temperature of the air which is circulated through secondary roller 34 can be adjusted. For example, air flow generating mechanism A can be adjusted such that warm or cool air is circulated through void 48. Circulating warm or cool air through void 48 will warm or cool secondary roller 34, respectively. Warming or cooling secondary rollers 34 will also warm or cool patient 66 (see FIG. 10) positioned on platform surface 31 (see FIG. 10). This is another important aspect of the present invention since adjusting the temperature of secondary rollers 34 to a patient's preference will enhance that patient's comfort during a medical procedure taking place on medical table 10. In addition, the ability to adjust the temperature of secondary rollers 34 may aid in the treatment of various medical conditions. For example, cooling secondary rollers 34 may aid medical personal in treating a patient suffering from a fever.

As shown in FIG. 6, secondary roller 34 also includes a number of partitions 56 secured to, and radially extending between, an outer surface 41 of suction tube 36 and an inner surface 43 of cylindrical bag 46. Partitions 56 are nearly rectangular in shape and extend along the entire length of cylindrical bag 46 and suction tube 36. Partitions 56 are secured to a first interior end surface 45 (see FIG. 5) and a second interior end surface 47 (see FIG. 5) of cylindrical bag 46. Partitions 56 can be secured to outer surface 41, inner surface 43, first interior end surface 45 (see FIG. 5) and second interior end surface 47 (see FIG. 5) with an adhesive.

Figure 9:
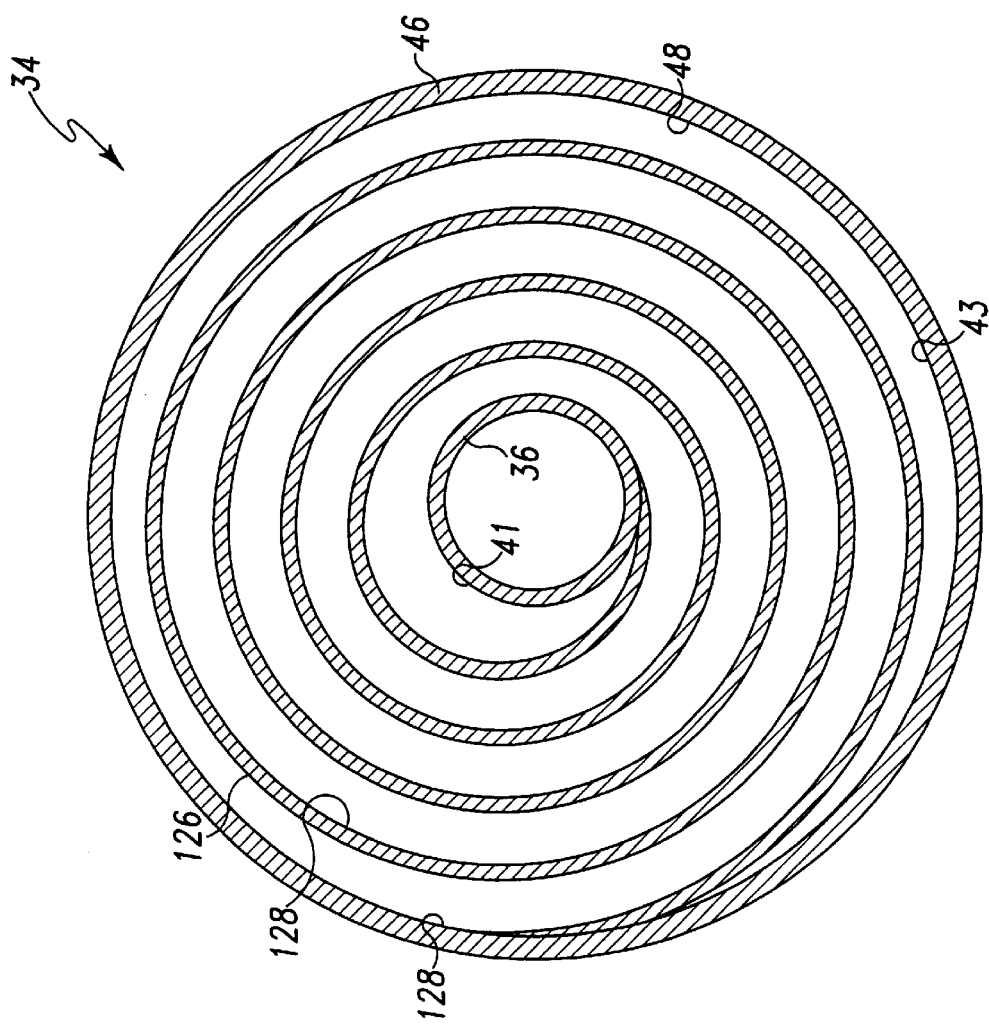
FIG. 9 is cross sectional view of an alternate embodiment of the secondary roller, with a spiral shaped compartment divider positioned within the secondary roller (note: the beads, the shaft cover and a number of ports have been removed for clarity of description)

One alternative configuration of secondary roller 34 is shown in FIG. 9, instead of partitions 56, secondary roller 34 can include a spiral-shaped compartment divider 126 positioned within void 48. Note that in FIG. 9, beads 50, shaft cover 112 and a number of ports 62 and 114 have been removed for clarity of description. Compartment divider 126 creates a spiral-shaped compartment 128 within void 48. Compartment divider 126 is secured to outer surface 41, inner surface 43, first interior end surface 45 (see FIG. 5) and second interior end surface 47 (see FIG. 5) with any appropriate adhesive.

Having partitions 56 or compartment divider 126 secured and arranged in the aforementioned manner functions to confine beads 50 within a number of compartments created in void 48. Having beads 50 confined to a number of compartments within void 48 prevents beads 50 from being redistributed by gravity as secondary roller 34 is rotated around its longitudinal axis. Partitions 56 or compartment divider 126 also prevents beads 50 from being redistributed by any movement they are subjected to prior to evacuation of void 48. Preventing the redistribution of beads 50 maintains the cylindrical shape of secondary roller 34.

Furthermore, having partitions 56 or compartment divider 126 attached to inner surface 43 of cylindrical bag 46 and outer surface 41 of suction tube 36 facilitates the simultaneous rotation of cylindrical bag 46 with suction tube 36.

Referring back to FIG. 6, each partition 56 has a screen 58 mounted therein which is adapted to allow the flow of a fluid therethrough but prevents a flow of beads 50 from one compartment to another. Thus, all the compartments within void 48 are in fluid communication with one another, which facilitates circulation of air through void 48 when void 48 is in fluid communication with air flow generating mechanism A.

In an alternative embodiment, secondary roller 34 can be constructed in an identical manner as described above, with the exception that no beads 50 are interposed between suction tube 36 and cylindrically shaped bag 46. In addition, one-way valve 122 (see FIG. 5) is replaced with a valve similar to valve 38 described above, i.e. a conventional two way stop cock valve. When no beads 50 are interposed between suction tube 36 and cylindrically shaped bag 46, the rigidity of secondary roller 34 is increased by introducing air into void 48 via air flow generating mechanism A, while the two way stop cock valve corresponding to valve 122 (see FIG. 5) is closed (i.e. no air can exit void 48 through the valve). Introducing air into void 48 in the above described manner causes cylindrically shaped bag 46 (and therefore secondary roller 34) to inflate and thus become a stable rigid structure.

Preferably, secondary rollers 34 are inflated in the above described manner prior to rotation of belt 32 (see FIG. 2) since having secondary rollers 34 inflated facilitates the rotation of belt 32 around the path defined by prime roller 33, end roller 49 and secondary rollers 34. In addition, secondary rollers 34 can be inflated when patient 66 positioned thereon (see FIG. 10) prefers a relatively rigid or hard bed surface.

On the other hand, if the patient 66 prefers a relatively soft bed surface, the two way stop cock valve can be opened thus allowing a portion of the air contained within void 48 to exit secondary roller 34. Allowing a portion of the air to exit void 48 will deflate secondary roller 34 and thus cause secondary roller 34 to become a relatively soft, pliable structure.

Now referring back to FIG. 3, end wall 27 has a number of ball-bearing brackets 75 mounted therein. Ball-bearing brackets 75 mounted in end wall 27 are identical to ball-bearing brackets 236 shown in FIG. 13. Portion 51 (see FIG. 5) of each suction tube 36 contained in secondary rollers 34 is positioned within a ball-bearing bracket 75. Portion 51 is positioned within ball-bearing bracket 75 in a manner identical to that shown in FIG. 13 with respect to one end of suction tube 252 and ball-bearing bracket 236. Specifically, portion 51 is positioned within ball-bearing bracket 75 such that portion 51 is in contact with an inner race of ball-bearing bracket 75 and extends through end wall 27. Having portion 51 positioned in the above described manner locates valve 38 outside of receptacle 37 (see FIG. 2) and thus facilitates the attachment of a manifold or hose 57 to valve 38.

The end of suction tube 36 opposite to portion 51 is secured to end wall 28 (see FIG. 1) by a mechanism that allows suction tube 36 to rotate about its longitudinal axis. For example, a bracket (not shown) having a bearing surface for rotatably mounting suction tube 36 can be fixed to end wall 28. Suction tube 36 is mounted in the bracket such that secondary roller 34 is able to rotate about its longitudinal axis.

Figure 10:
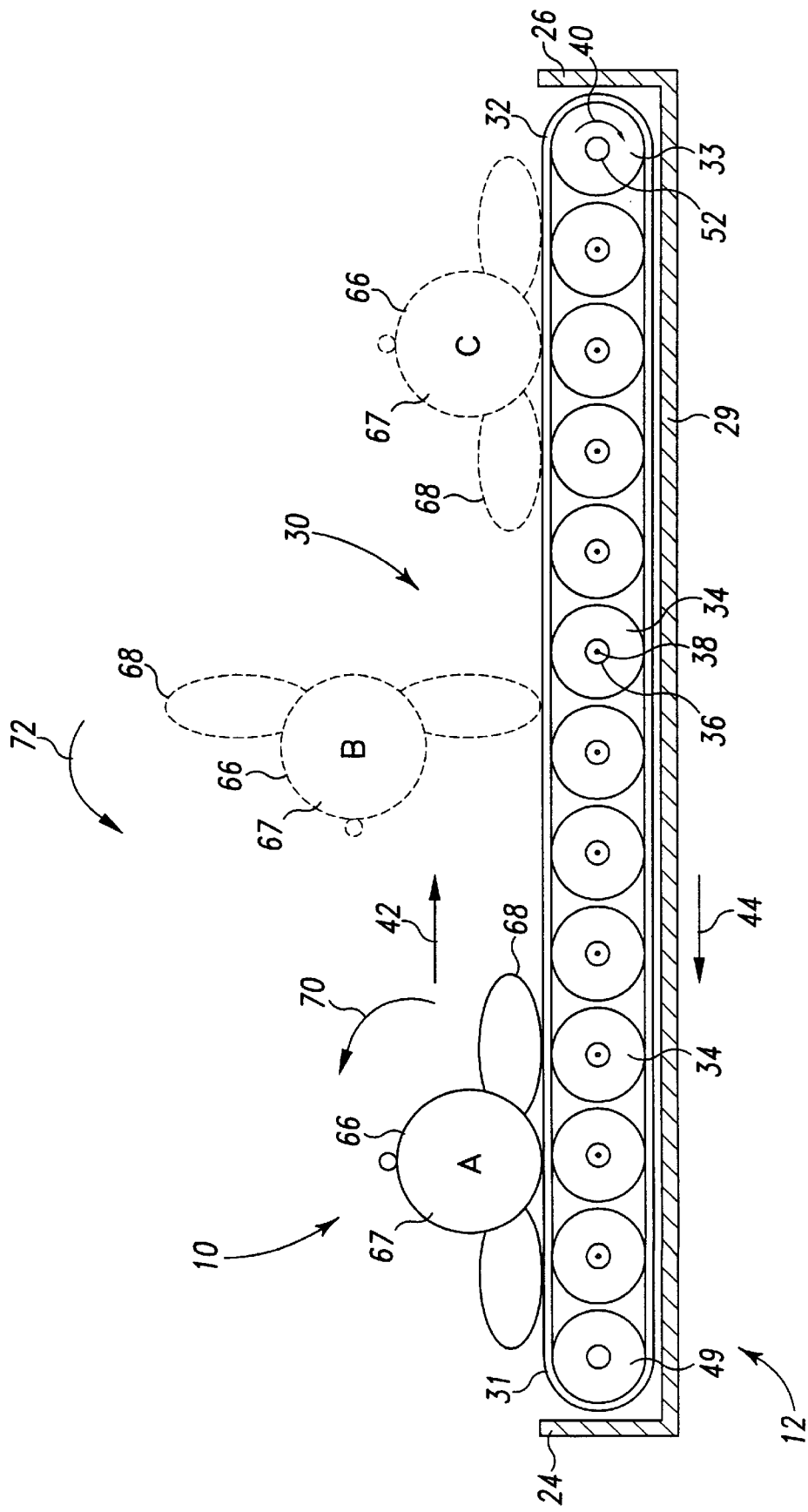
FIG. 10 is an elevational view of an end of the medical table shown in FIG. 1, with the medical table shown having a patient disposed thereon which is being moved from a first position to a second position (note: the size of the patient is reduced relative to the size of the medical table for clarity of description)

Now referring to FIG. 10, there is shown three sequential views, A, B and C, of a patient 66 supported on platform surface 31 of medical table 10. Note that the size of the patient is reduced relative to the size of medical table 10 for clarity of description. Patient 66 is supported on platform surface 31 such that the top of the patient's head 67 is positioned adjacent to end edge 29. Note that in FIG. 10 end wall 27 has been removed for clarity of description. View A illustrates patient 66 lying in a supine position (i.e. lying face upward). View B illustrates patient 66 lying in a lateral position (i.e. lying on a side). View C illustrates patient 66 lying in a prone position (i.e. lying face downward). How medical table 10 functions to aid in positioning patient 66 from supine position A to prone position C is discussed in detail below. However, it should be understood that table 10 can also be used to aid in positioning patient 66 in other positions as well.

Patient 66 is supported on platform surface 31 in supine position and motor M (see FIG. 4) is actuated, thereby rotating prime roller 33 in a clockwise direction as indicated by arrow 40. The frictional engagement of belt 32 with prime roller 33 causes belt 32 to rotate about prime roller 33, end roller 49 and secondary rollers 34 in the directions indicated by arrows 42 and 44. The rotation of belt 32 causes platform surface 31 to move in the direction indicated by arrow 42, therefore patient 66 also moves in the direction indicated by arrow 42. As patient 66 moves in the aforementioned direction, his or her shoulder 68 is gently lifted off of platform surface 31 by medical personnel (not shown) in the direction indicated by arrow 70. The medical personnel continues to lift and support shoulder 68 until patient 66 is disposed in lateral position B. Once in lateral position B, shoulder 68 of patient 66 is gently lowered toward platform surface 31 by the medical personnel in the direction indicated by arrow 72 until patient 66 is disposed in prone position C. It should be understood that other portions of the patient's 66 body, such as a hip (not shown), can be lifted and moved in a similar manner as that described for shoulder 68 to facilitate the repositioning of patient 66.

Once patient 66 is disposed in prone position C, motor M is switched off, thereby stopping the movement of platform surface 31. Once motor M is switched off and secondary rollers 34 stop rotating, each valve 38 can be placed in fluid communication with either vacuum source S or air flow generating mechanism A (see FIG. 5). Once each valve 38 is in fluid communication with either vacuum source S or air flow generating mechanism A the rigidity or temperature of secondary rollers 34 can be adjusted to the patient's 66 preference as previously discussed.

Figure 11:
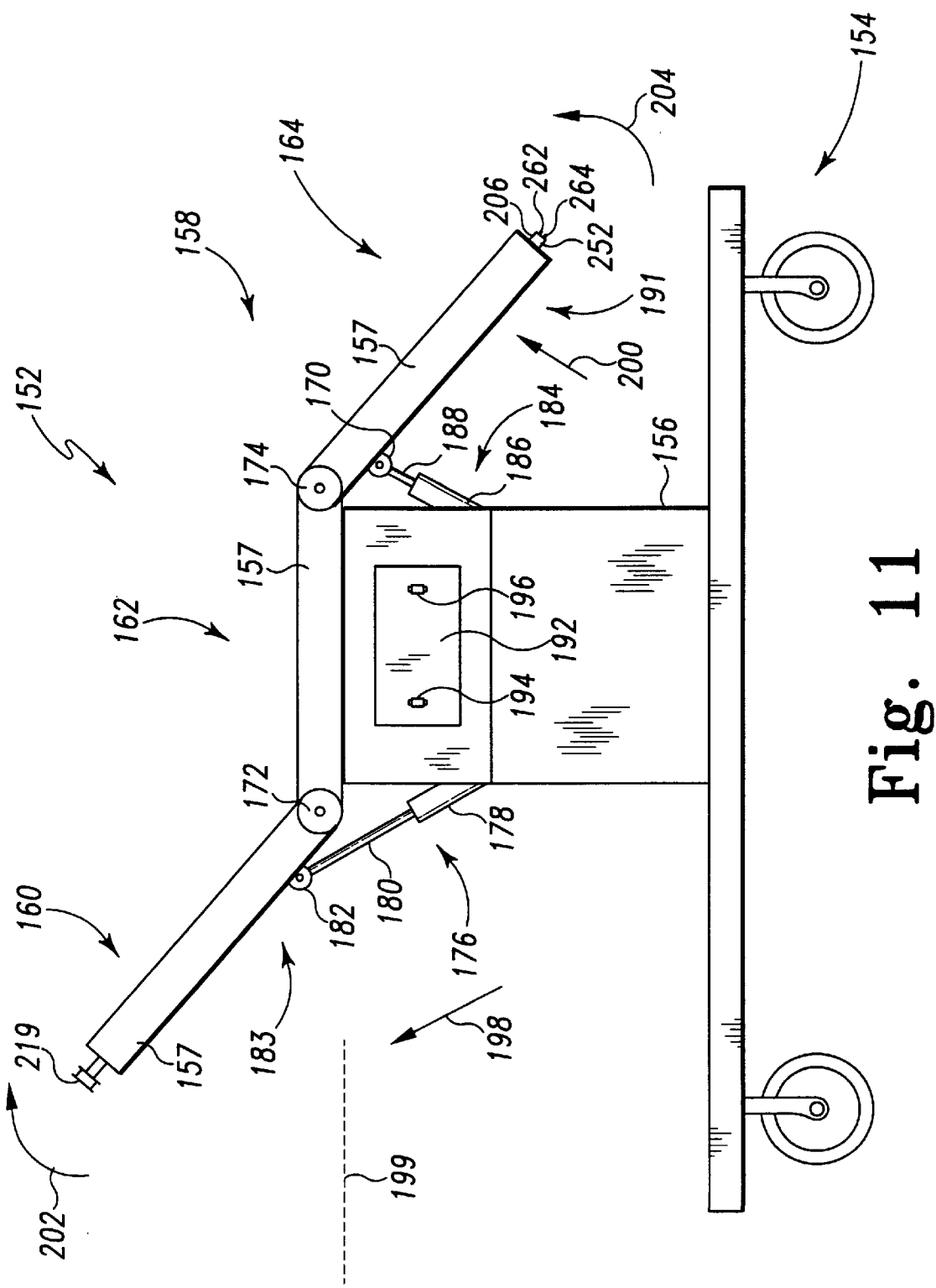
FIG. 11 is a side elevational view of a medical table similar to the one shown in FIG. 1, but having the bed shell divided into a number of movable segments.

As shown in FIG. 11, a medical table 152 capable of positioning a patient's torso and/or legs (not shown) at an angle relative to a horizontal axis 199 is also contemplated. Medical table 152 is similar to medical table 10 in that it includes a cart 154 having a number of wheels, and a support member 156 mounted on cart 154. Medical table 152 also includes a bed shell 158 mounted on support member 156. Medical table 152 further includes a roller-belt complex 159 (see FIGS. 12 and 13) contained within bed shell 158. However, unlike medical table 10 described above, bed shell 158 and roller-belt complex 159 of medical table 152 are divided into a number of segments.

Figure 12:
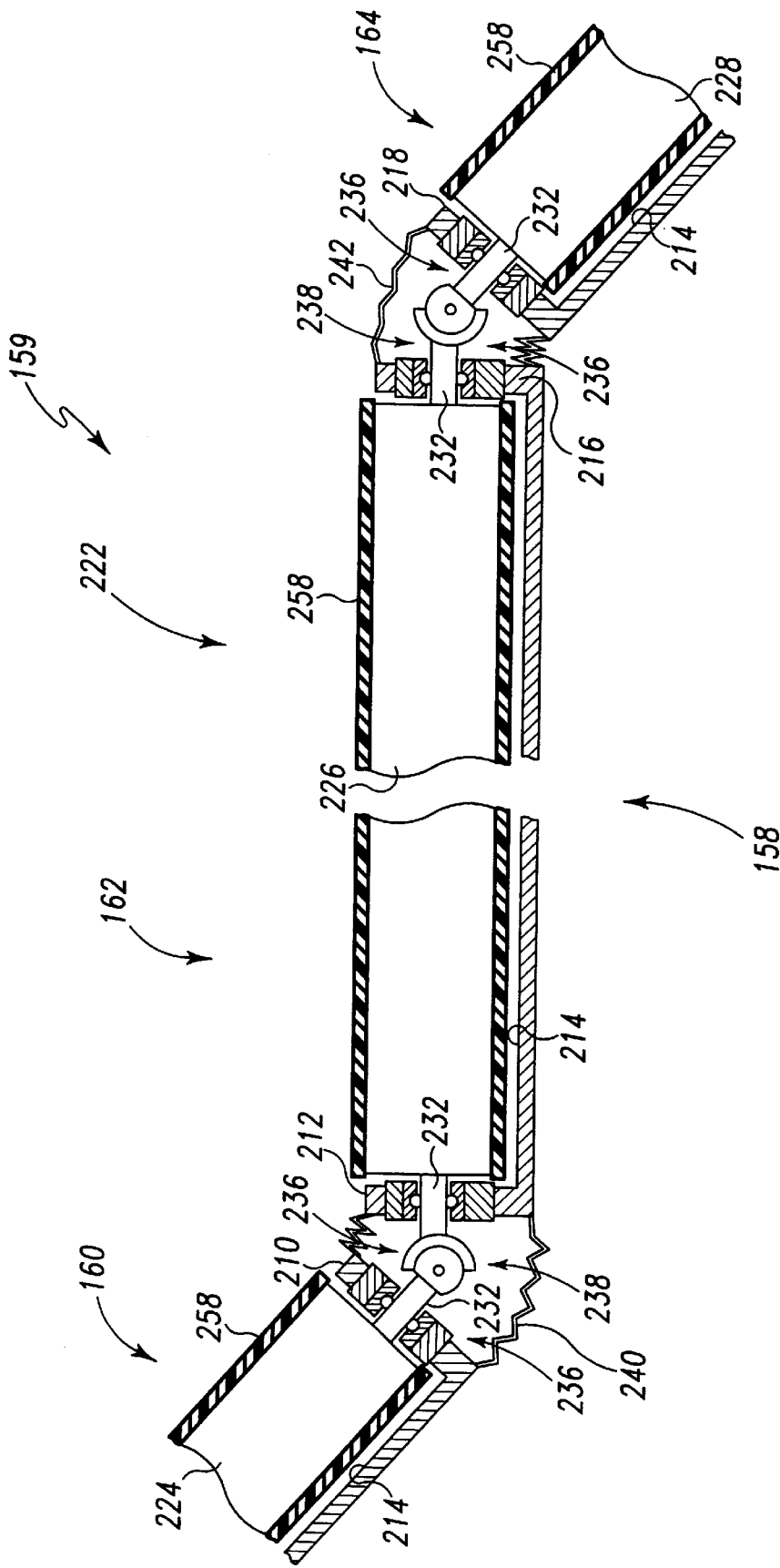
FIG. 12 is an enlarged cross sectional view of the medical table shown in FIG. 11, with a side wall of the bed shell removed to show the prime roller.

As shown in FIGS. 11, 12 and 13, bed shell 158 is divided into a left segment 160, a center segment 162, and a right segment 164. Note that side wall 157 has been removed in FIGS. 12 and 13 for clarity of description. Left segment 160 includes two end walls, however, only end wall 210 is shown in FIGS. 12 and 13. End wall 210 has a number of ball-bearing brackets 236 mounted therein. The other end wall of left segment 160 has a single ball-bearing bracket (identical to ball-bearing bracket 236) mounted therein. It should be understood that ball-bearing brackets 236 provide a passageway through each end wall in which they are mounted.

Center segment 162 includes an end wall 212 and an end wall 216. Both end wall 212 and end wall 216 of center segment 162 have ball-bearing-brackets 236 mounted therein. Center segment 162 is secured to support member 156.

Right segment 164 also includes two end walls, however, only end wall 218 is shown in FIGS. 12 and 13. Both end walls of right segment 164 have ball-bearing brackets 236 mounted therein.

Left segment 160, center segment 162 and right segment 164 each define a substantially rectangular receptacle 214 similar to receptacle 37 described in reference to medical table 10. Left segment 160 is pivotally secured to center segment 162 via pivot joint 172 (see FIG. 11). Right segment 164 is pivotally secured to center segment 162 via pivot joint 174 (see FIG. 11).

Medical table 152 also includes a mechanism for positioning left segment 160 and right segment 164 at an angle relative to horizontal axis 199. One mechanism for positioning left segment 160 and right segment 164 which may be used in the present invention with some modifications is described in U.S. Pat. No. 3,967,328 issued to Cox the disclosure of which is herein incorporated by reference. The mechanism for positioning left segment 160 and right segment 164 includes a left hydraulic cylinder 176 and a right hydraulic cylinder 184. Left hydraulic cylinder 176 includes a housing 178 attached to support member 156. Left hydraulic cylinder 176 also includes a movable rod 180 which is positioned within housing 178. An end of movable rod 180 is secured to an ear 182. Ear 182 is attached to an under-portion 183 of left segment 160.

Extension of movable rod 180 out of housing 178 in a direction indicated by arrow 198 causes left segment 160 to move in a direction indicated by arrow 202. Retraction of movable rod 180 into housing 178 in a direction opposite to the direction indicated by arrow 198 causes left segment 160 to move in a direction opposite to the direction indicated by arrow 202. Movement of movable rod 180 in the above described manner results in left segment 160 being positioned at various angles relative to horizontal axis 199. However, it should be understood that movable rod 180 can be moved such that left segment 160 is in a substantially parallel relationship with horizontal axis 199.

Right hydraulic cylinder 184 includes a housing 186 attached to support member 156. Right hydraulic cylinder 184 also includes a movable rod 188 which is positioned within housing 186. An end of movable rod 188 is secured to an ear 190. Ear 190 is attached to an under-portion 191 of right segment 164.

Extension of movable rod 188 out of housing 186 in a direction indicated by arrow 200 causes right segment 164 to move in a direction indicated by arrow 204. Retraction of movable rod 188 into housing 186 in a direction opposite to the direction indicated by arrow 200 causes right segment 164 to move in a direction opposite to the direction indicated by arrow 204. Movement of movable rod 188 in the above described manner results in right segment 164 being positioned at various angles relative to horizontal axis 199. However, it should be understood that movable rod 188 can be moved such that right segment 164 is in a substantially parallel relationship with horizontal axis 199.

The mechanism for positioning left segment 160 and right segment 164 also includes a control panel 192 secured to support member 156. Control panel 192 includes a left control lever 194 and a right control lever 196. Left control lever 194 is operatively linked to left hydraulic cylinder 176 such that movement of left control lever 194 actuates movable rod 180 in the above described manner. Right control lever 196 is operatively linked to right hydraulic cylinder 184 in a similar fashion.

As shown in FIGS. 12 and 13, elements of roller-belt complex 159 are divided into a number of segments. Prime roller 222, including shaft 232, is divided into a left portion 224, a center portion 226 and a right portion 228. As shown in FIG. 12, left portion 224 is located within receptacle 214 of left segment 160. Left portion 224 is positioned in receptacle 214 such that a section of shaft 232 extends through end wall 210 and contacts an inner race of ball-bearing bracket 236. Left portion 224 is further positioned in receptacle 214 such that a section of shaft 232 extends through the end wall (not shown) opposite to end wall 210, and contacts an inner race of the ball-bearing bracket (not shown) mounted therein. Positioning left portion 224 in the above described manner locates a pulley 219 secured to an end of shaft 232 outside of receptacle 214 as shown in FIG. 11.

Center portion 226 is located within receptacle 214 of center segment 162. Center portion 226 is positioned in receptacle 214 such that a section of shaft 232 extends through end wall 212 and contacts an inner race of ball-bearing bracket 236. Center portion 226 is further positioned in receptacle 214 such that another section of shaft 232 extends through end wall 216 and contacts an inner race of ball-bearing bracket 236 mounted therein.

Right portion 228 is located within receptacle 214 of right segment 164. Right portion 228 is positioned in receptacle 214 such that a section of shaft 232 extends through end wall 218 and contacts an inner race of ball-bearing bracket 236. The end (not shown) of shaft 232 opposite to the end secured to pulley 219 (see FIG. 11) is secured to the end wall of right segment 164 opposite to end wall 218 by any well known mechanism that allows shaft 232 to rotate about each portion's (i.e. left portion 224, center portion 226 and right portion 228) longitudinal axis. For example, a bracket (not shown) having a bearing surface for rotatably mounting shaft 232 can be fixed to the end wall. Shaft 232 is mounted in the bracket such that prime roller 222 is able to rotate each portion (i.e. left portion 224, center portion 226 and right portion 228) about its longitudinal axis.

The section of shaft 232 extending through end wall 210 and the section of shaft 232 extending through end wall 212 are connected by a universal joint 238. The section of shaft 232 extending through end wall 216 and the section of shaft 232 extending through end wall 218 are also connected by a universal joint 238. Universal joints 238 allow the portions of shaft 232 (i.e. left portion 224, center portion 226 and right portion 228) to be angled relative to one another and still effectively transfer torque therebetween. Therefore, a single motor (not shown) operatively linked to left portion 224 via pulley 219 will simultaneously rotate left portion 224, center portion 226 and right portion 228 of prime roller 222.

As shown in FIGS. 12 and 13, a rubber protection member 240 is attached to end walls 210 and 212. Rubber protection member 240 surrounds a space defined between end walls 210 and 212 so that a patient positioned on medical table 152 will not come into contact with universal Joint 238. Rubber protection member 240 also prevents a portion of a patients body from being pinched between end walls 210 and 212 when left segment 160 is moved relative to center segment 162. A rubber protection member 242 is also attached to end walls 216 and 218 in an identical manner for the identical purpose.

It should be understood that medical table 152 also includes an end roller (not shown). The end roller functions in a substantially similar way as described above in reference to end roller 49. The end roller included in medical table 152 is constructed in an identical manner as described above in reference to prime roller 222, with the exception that an end of the end roller is not attached to a pulley. Instead the end roller is secured to the end wall of left segment 160 opposite to end wall 210 by any well known mechanism that allows end roller to rotate about each portion's (i.e. left portion, center portion and right portion) longitudinal axis. The end roller is also secured to the end wall of right segment 164 opposite to end wall 218 by an identical mechanism.

As with prime roller 222, each secondary roller 244 (see FIG. 13), including suction tube 252 contained therein, is divided into a left portion 246, a center portion 248 and a right portion 250. Left portion 246, center portion 248 and right portion 250 includes a valve 262 and a one-way valve 264 (see FIGS. 11 and 14). Valve 262 and one-way valve 264 function in the same way as described above in reference to valves 38 and one-way valve 122. As shown in FIG. 13, left portion 246 is located within receptacle 214 of left segment 160. Left portion 246 is positioned in receptacle 214 such that a section of suction tube 252 extends through end wall 210 and contacts an inner race of a ball-bearing bracket 236. An end (not shown) of suction tube 252 is secured to the end wall of left segment 160 opposite to end wall 210 by any well known mechanism that allows suction tube 252 to rotate about its longitudinal axis. As discussed previously, a bracket (not shown) having a bearing surface for rotatably mounting suction tube 252 can be fixed to the end wall. Suction tube 252 is mounted in the bracket such that the portion of suction tube 252 located in left segment 160 is able to rotate about its longitudinal axis.

Center portion 248 is located within receptacle 214 of center segment 162. Center portion 248 is positioned in receptacle 214 such that a section of suction tube 252 extends through end wall 212 and contacts an inner race of ball-bearing bracket 236 mounted therein. Center portion 248 is further positioned in receptacle 214 such that another section of suction tube 252 extends through end wall 216 and contacts an inner race of ball-bearing bracket 236 mounted therein.

Right portion 250 is located within receptacle 214 of right segment 164. Right portion 250 is positioned in receptacle 214 such that a section of suction tube 252 extends through end wall 218 and contacts an inner race of a ball-bearing bracket 236 mounted therein. Right portion 250 is further positioned in receptacle 214 such that a section of suction tube 252 extends through the end wall (not shown) opposite to end wall 218, and contacts an inner race of the ball-bearing bracket mounted therein. Positioning right portion 250 in the above described manner locates a section 206 (see FIG. 11) of suction tube 252 outside of receptacle 214 as shown in FIG. 11. Having section 206 positioned in the above described manner locates valve 262 and one-way valve 264 (see FIG. 11) outside of receptacle 214 and thus facilitates the attachment of a manifold (not shown) or a hose (not shown) to valve 262.

Figure 14:
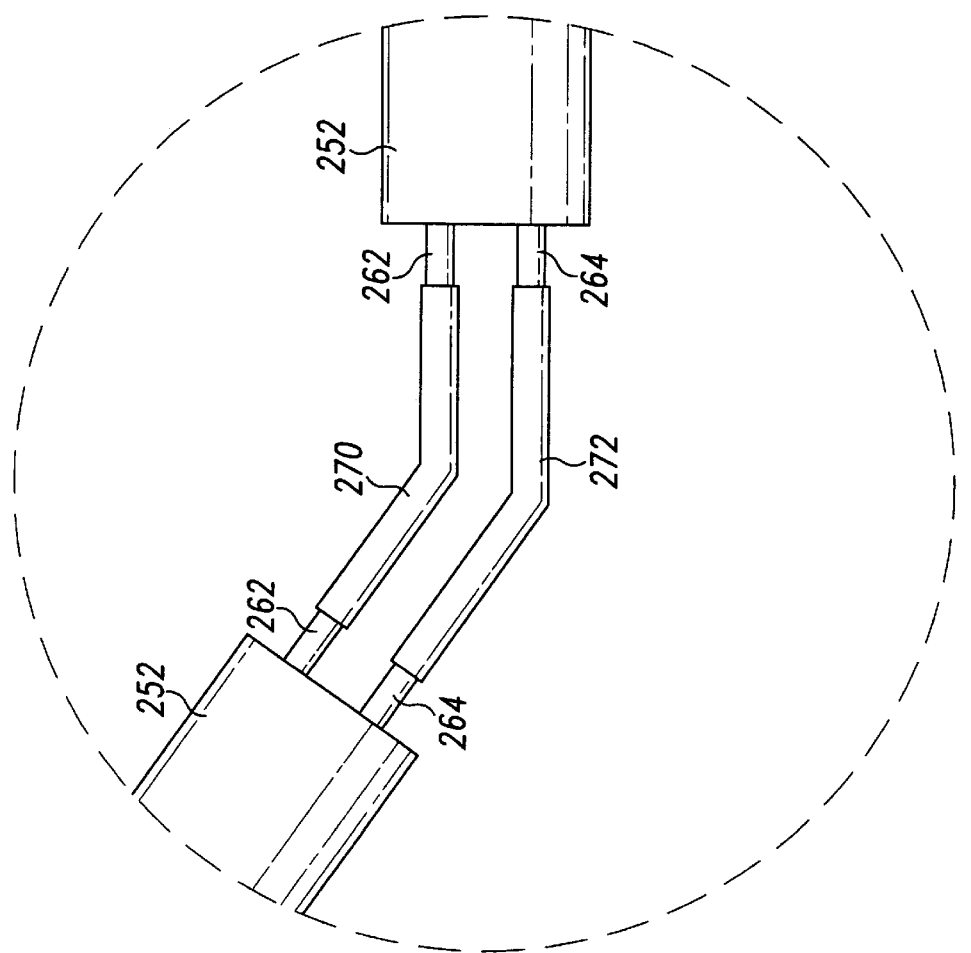
FIG. 14 is an enlarged view of a portion of FIG. 13 which is encircled and indicated as FIG. 14.

As shown in FIGS. 13 and 14, valve 262 attached to the section of suction tube 252 extending through end wall 210 and valve 262 attached to the section of suction tube 252 extending through end wall 212 are in fluid communication via a flexible hose 270. In a similar manner, valve 264 attached to the section of suction tube 252 extending through end wall 210 and valve 264 attached to the section of suction tube 252 extending through end wall 212 are in fluid communication via a flexible hose 272. Valves 262 and one-way valves 264 interposed between center portion 248 and right portion 250 are placed in fluid communication in an identical manner (i.e. utilizing flexible hoses). Therefore, valve 262 and one-way valve 264 (see FIG. 11) located out side of receptacle 214 of right segment 164 are utilized to evacuate, or circulate air through, each portion (i.e. left portion 246, center portion 248 and a right portion 250) of secondary roller 244.

It should be understood that a belt 258 is disposed around prime roller 222, secondary rollers 244 and the end roller in a manner similar to that described above in reference to belt 32, with the exception that belt 258 is also divided into left, center, and right portions as shown in FIGS. 12 and 13. Belt 258 ensures that each portion of secondary rollers 244 and each portion of the end roller rotate simultaneously with each portion of prime roller 222. Having each portion of secondary rollers 244 rotate simultaneously with each portion of prime roller 222 ensures that hoses 270 and 272 will not become twisted during use of medical table 152. Therefore, it should be appreciated that medical table 152 functions in substantially the same way as described above in reference to medical table 10. However, medical table 152 has an additional advantage of allowing a patient (not shown) placed thereon to be positioned at any one of a number of angles relative to horizontal axis 199 (see FIG. 199).

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

For example, medical table 10 or medical table 152 can include more than one prime roller. Specifically, end roller 49 of medical table 10 can be substituted with a prime roller identical to prime roller 33. In a similar fashion, the end roller of medical table 152 can be substituted with a prime roller identical to prime roller 222. These additional prime rollers can then be coupled to a motor for rotation.

In addition, while prime roller 33 of medical table 10 and prime roller 222 of medical table 152 are described as being coupled to, and rotated by, a motor (e.g. motor M), it should be understood that these prime rollers can also be mechanically coupled to a spring powered wind-up mechanism for rotation. Alternatively, the prime rollers can be mechanically coupled to a crank and manually rotated.

Moreover, while left segment 160 and right segment 164 of medical table 152 are described as being moved by left hydraulic cylinder 176 and right hydraulic cylinder 184, it should be understood that left segment 160 and right segment 164 can be mechanically coupled to a crank, and manually positioned at various angles relative to horizontal axis 199.

Furthermore, it should be understood that having medical table 10 or medical table 152 built in such a way that medical table 10 and 152 can accommodate X-ray fluoroscopy is contemplated.

What is claimed is:

1. A medical table, comprising:

a base;

a number of rollers, supported by said base, which collectively define a bed surface for supporting a patient, wherein each roller of said number of rollers defines a fluid impervious bag having a void therein;

a motor coupled to at least one of said number of rollers so that said motor is operative to rotate at least said one roller; and an air flow generating mechanism in fluid communication with said void of each of said number of rollers.

2. The apparatus of claim 1, wherein:

said number of rollers include a prime roller having a shaft extending therefrom, and said prime roller is operatively coupled to a drive mechanism.

3. A method of moving a patient from a first position to a second position, comprising the steps of:

providing a number of rollers which collectively define a bed surface, wherein each roller of the number of rollers defines a fluid impervious bag having a void therein;

coupling the number of rollers to a motor so that the motor is operative to rotate the number of rollers:

advancing air into each void of the number of rollers with an air flow generating mechanism;

locating a patient in a first position on the bed surface; and rotating the number of rollers with the motor so as to move the patient from a first position to a second position after the air advancing step.

4. The method of claim 3, further comprising the step of:

evacuating air from each void of the number of rollers after the rotating step.

* * * * *